March 6, 1934.  R. RECHNITZER  1,949,842

UNICONTROLLED RADIO CIRCUIT

Filed May 27, 1929

INVENTOR
RUDOLF RECHNITZER
BY
ATTORNEY

Patented Mar. 6, 1934

1,949,842

UNITED STATES PATENT OFFICE 1,949,842

UNICONTROLLED RADIO CIRCUIT

Rudolf Rechnitzer, Berlin, Germany, assignor to Telefunken Gesellschaft für Drahtlose Telegraphie m. b. H., Berlin, Germany, a corporation of Germany Application May 27, 1929, Serial No. 366,168
In Germany July 7, 1928

7 Claims. (Cl. 250—40)

The present invention relates to means for simultaneously regulating two oscillation circuits, and more particularly to a uni-control device for tuning such circuits to the same frequency or to a constant frequency difference.

Figure 1:
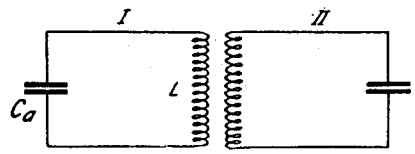

It is often desirable to regulate two oscillation circuits simultaneously by a joint knob, for instance, in such a way that their frequencies inside the entire range of regulation remain identical or are maintained at an invariable difference. For example, of the two oscillation circuits shown in Figure 1 of the accompanying drawing, I is the oscillation circuit of the antenna, and II the grid oscillation circuit of the receiver tube. $C_a$ denotes the antenna capacity, and L the inductance of the coupling coil and other parts of this circuit.

Now, if the two inter-coupled circuits I and II are to be set by a sole manipulation so as to receive the wave of the desired station, several difficulties will be encountered which are due to the fact that the two circuits must be similarly designed in order that they may undergo identical alterations throughout the entire range of regulation. If such regulation is to be effected by means of adjustment of the inductances, this involves the drawback that variometers of standard design as a rule result in a far smaller range of variation than rotary condensers. Variometers in mutual coupling, furthermore, have a comparatively high damping, and also the regulating devices are more expensive than when adjustment is effected by the aid of condensers.

Figure 2:
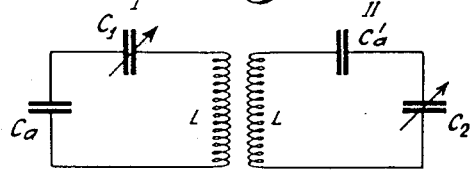

However, when recourse is had to rotary condensers, further difficulties are encountered. When circuit II, as shown in Figure 2, is balanced in relation to the antenna circuit I by the insertion of a small condenser $C'_a$ simulating the antenna capacity $C_a$, the regulating range is too small. For even if the maximum capacity of the regulating condensers $C_1$ and $C_2$, respectively, is high compared with the antenna capacities $C_a$ and $C'_a$, respectively, it can not be fully utilized owing to the series connection; for, in that instance, as is well known, the capacity resulting from the two condensers must always remain lower than the lower one of the two capacities, so that the ensuing capacity of each circuit can not exceed the value $C_a$.

Figure 3:
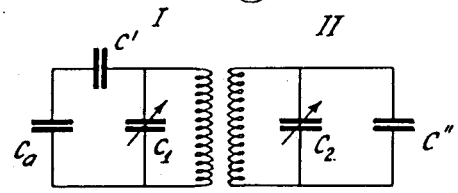

However, if the arrangement is chosen in a way as shown in Figure 3, where the regulating condensers $C_1$ and $C_2$ are disposed in parallel relation to the circuit inductances, and the simulating or balancing capacity $C''$ is equal to the resulting capacity of $C_a$ of the antenna and $C'$, the shortening condenser, then by regulation of $C_1$ and $C_2$ a sufficiently large range of variation is securable, if the other capacities connected in parallel therewith are but low compared with them. But, then, the capacitive coupling of the antenna becomes too loose, particularly towards the end of the range of variation.

Now, the difficulties as hereinbefore enumerated can be obviated if, in accordance with the present disclosure, arrangements are so made that in the presence of smaller angles of rotation of the controlling spindle (say, between 0 to 90 degrees, figures in the sense of growing capacities), essentially, only the rotary (variable) condensers of the two circuits are set whose plate contour is so chosen that their capacities grows at an increasingly greater rate with growing angle of rotation, while in the presence of larger angles of rotation (say, between 90 and 180 degrees) the inductance of one of the two circuits also substantially partakes of the regulation.

Briefly, this could be accomplished by so constructing the circuit that the rotor member of the variometer is simultaneously adjusted from the joint control spindle and driven by said spindle only inside the range of larger angles of rotation. However, the simplest regulating means is obtained if the rotor member of the variometer is secured to the same control spindle as the rotors of the two rotary condensers, though being so displaced with relation to the latter, that its motion, in the presence of relatively small angles of rotation, has no, or practically no, influence upon the inductance of the whole variometer.

The novel features which I believe to be characteristic of my invention are set forth in particularity in the appended claims, the invention itself, however, as to both its organization and method of operation will best be understood by reference to the following description taken in connection with the drawing in which I have indicated diagrammatically several circuit organizations whereby my invention may be carried into effect.

One embodiment of the invention shall be explained further below by reference to Figures 4–6 inclusive.

Figure 4:
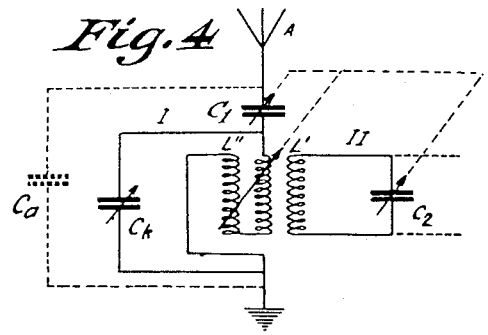
Figure 5:
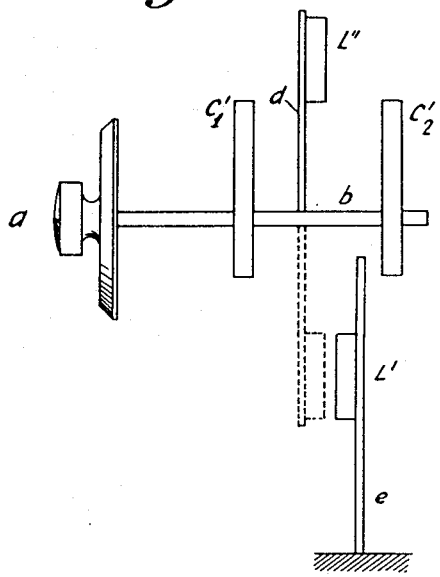

In the scheme shown in Figure 4, a regulating condenser $C_1$ and a variometer comprising two parts L', L'' are connected in series with the antenna A, whose capacity is represented by the equivalent condenser $C_a$, indicated by the dotted lines. The grid oscillation circuit II of the receiver tube is adjusted by the aid of a regulating condenser $C_2$. Rotors $C'_1$ and $C'_2$ of the two rotary condensers (Figure 5) are moved by means of a common control knob $a$ and control spindle $b$ upon which they are secured.

The flat coil $L'$ is rigidly and directly fixed by means of a support $e$, while flat coil $L''$ is attached to the control spindle $b$ by means of an arm $d$. Flat coil $L''$ is so displaced relative to the condensers that its motion, in the presence of smaller angles of rotation (say, between 0 and 90 degrees figured in the direction of growing capacities), exercises little, or no, influence upon the total self-induction of the variometer; while, for larger angles of rotation (say, between 90 and 180 degrees), it is disposed inside the sphere of influence of the stationary (stator) coil $L'$, with the result that the total inductance is affected to an increasingly higher degree.

Figure 6:
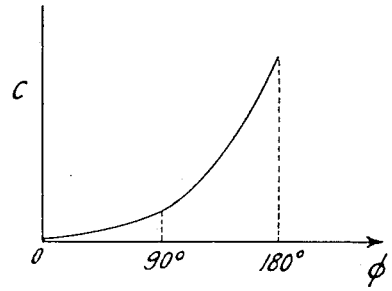

The contours or sections of the plates of the two regulating condensers are so chosen that their capacity changes follow a curve, shown approximately in Figure 6. In other words, it grows more markedly in absolute terms as the angle of rotation grows. What is probably most suited for this purpose is the so-called "frequency contour or section", i. e., a contour which, at constant inductance of the oscillation circuit, results in the tuned frequency linearly growing with the angle of rotation of the condenser. The so-called "percentage section", i. e., a cross-sectional form in which the percentage frequency change increases linearly with the rotation angle, or similar forms, can also be used.

At smaller angles of rotation, capacities $C_1$ and $C_2$, as shown in Figure 6, are only small. The antenna capacity $C_a$ (which as a rule, ranges between 200 and 500 cm.) is considerably higher inside this range than capacity $C_1$ so that the resulting capacity substantially is governed by the latter. However, as the regulation proceeds, the capacity of the antenna falls more and more behind the capacity $C_2$. It is at this point that the coil $L''$ becomes operative and effective in that the latter approaches more and more the range of action of coil $L'$ so that the inductance of the entire variometer is more and more enlarged, with the result that the deficiency in tuning is corrected. Optimum cooperation of the two coils can be secured by mounting them adjustably upon their supporting members $d$ and $e$ as, by shifting them, for example, along the latter.

The arrangement hereinbefore described makes it possible to adjust the tuning by a joint control knob in a rapid and safe manner coarsely to the desired wave to be received, and to make the latter audible. Further setting to optimum volume is thereupon effected by the agency of a vernier condenser $C_k$ shown in shunt with coils $L'$ and $L''$ in Figure 4, the latter making it also possible to adapt conditions to whatever changes there may occur in the antenna capacity.

While I have indicated and described several systems for carrying my invention into effect, it will be apparent to one skilled in the art that my invention is by no means limited to the particular organizations shown and described, but that many modifications in the circuit arrangements, as well as in the apparatus employed, may be made without departing from the scope of my invention as set forth in the appended claims.

What I claim is:—

1. In combination, a plurality of tunable circuits each including an inductance and a capacity, the inductances of the circuits being coupled, means for simultaneously and similarly varying the capacity in each circuit, and additional means for varying the value of the inductance of one of said circuits during only a portion of said simultaneous capacity variation, said additional means being mechanically coupled to said capacity varying means continually.

2. In combination, a plurality of tunable circuits each including an inductance and a variable capacity, the inductances of the circuits being coupled, uni-control means for simultaneously varying the capacity in each circuit, and additional means for varying the value of the inductance of one of said circuits during only a portion of said simultaneous capacity variation, said additional means being mechanically and movably coupled to said uni-control means continually.

3. In combination, a plurality of tunable circuits, one of said circuits including a variometer and a variable capacity, the other circuit including a variable capacity and an inductance, said variometer and inductance being coupled, uni-control means for simultaneously varying the capacity in each circuit, and additional means, including the movable portion of said variometer, for varying the value of the inductance of said first circuit during only a portion of said simultaneous capacity variation, said movable portion being mechanically coupled to said uni-control means continually.

4. In combination, a pair of tunable circuits, one of said circuits including a variable condenser and a variable inductance, the other circuit including a variable condenser and an inductance, said variable inductance and said last named inductance being coupled, a common control means, the variable elements of said condensers being mounted on said control means, and additional means, including the movable element of said variable inductance, for varying the value of the inductance of said first tunable circuit, said movable element being mounted upon said common means for simultaneous movement therewith, and being arranged to vary the inductance of said first tunable circuit during only a portion of the displacement of said condenser variable elements.

5. In combination, a tunable circuit including a variable condenser and a variometer, a second tunable circuit including a fixed inductance and a variable condenser, said variometer and inductance being coupled, a common control shaft, the rotors of said variable condensers being mounted upon said shaft, the rotor of said variometer also being mounted upon said shaft, said last mentioned rotor being so positioned relative to the variometer stator that the inductance of the first circuit is varied during only a portion of the movement of said condenser rotors.

6. In combination, a pair of tunable circuits, one of said circuits being an antenna circuit and including a variable condenser and a variable inductance, the other circuit including a variable condenser and an inductance, said variable inductance and said last named inductance being coupled, a common control means, the variable elements of said condensers being mounted on said control means for rotation through a desired arc, and additional means, including the movable element of said variable inductance, for varying the value of the inductance of said first tunable circuit, said movable element being mounted upon said common means for simultaneous movement therewith, and being arranged to vary the inductance of said first tunable circuit during only a later portion of the displacement of said condenser variable elements through said arc.

7. In combination, a plurality of tunable circuits each including an inductance and a capacity, the inductances of the circuits being coupled, means for simultaneously and similarly varying the capacity in each circuit, and additional means for varying the value of the inductance of one of said circuits during only a portion of said simultaneous capacity variation, said additional means being mechanically coupled to said capacity varying means continually and an adjustable vernier tuning condenser in shunt across the inductance in said one circuit.

RUDOLF RECHNITZER.